(12) United States Patent
Zeng (10) Patent No.: US 10,637,974 B2
(45) Date of Patent: Apr. 28, 2020

(54) FUNCTIONAL DEVICE, ELECTRONIC APPARATUS, AND MOBILE TERMINAL

(71) Applicant: GUANGDONG OPPO MOBILE TELECOMMUNICATIONS CORP., LTD., Dongguan, Guangdong (CN)

(72) Inventor: Yuanqing Zeng, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/044,039

(22) Filed: Jul. 24, 2018

(65) Prior Publication Data

US 2019/0141170 A1    May 9, 2019

(30) Foreign Application Priority Data

Oct. 31, 2017 (CN) .......................... 2017 1 1055090
Oct. 31, 2017 (CN) ...................... 2017 2 1433769 U (51) Int. Cl.
*H04M 1/00* (2006.01)
*H04M 1/02* (2006.01)
(Continued)

(52) U.S. Cl.
CPC ........ *H04M 1/0237* (2013.01); *G06F 1/1624* (2013.01); *G06F 1/1626* (2013.01);
(Continued)

(58) Field of Classification Search
CPC ............ H04M 1/2037; H04M 1/0266; H04M 1/0277; H04M 1/0237; H04M 1/026;
(Continued)

(56) References Cited

U.S. PATENT DOCUMENTS

2005/0288076 A1* 12/2005 Seol .................... H04M 1/0237
455/575.4
2012/0300415 A1   11/2012 Yang
(Continued)

FOREIGN PATENT DOCUMENTS

CN        101907761 A    12/2010
CN        203054764 U     7/2013
(Continued)

OTHER PUBLICATIONS

European search report for Application No. EP18182917.7, dated Feb. 18, 2019 (10 pages).
Espacenet English abstract of CN106850896A.

*Primary Examiner* — Nhan T Le
(74) *Attorney, Agent, or Firm* — Ladas & Parry LLP (57) ABSTRACT

A functional device is described. The functional device includes a housing, a functional component disposed in the housing and movable between a first position at which the functional component extends out of the housing and a second position at which the functional component retracts into the housing, and a driving mechanism. The driving mechanism is disposed in the housing and includes: a first wheel connected to the functional component, abutting against an inner wall of the housing and rotatable relative to the housing to drive the functional component to move between the first position and the second position, and a driving assembly connected to the first wheel and configured to drive the first wheel to rotate. An electronic apparatus and a mobile terminal are further provided.

20 Claims, 9 Drawing Sheets

(51) Int. Cl.
*G06F 1/16* (2006.01)
*H04N 5/225* (2006.01)
(52) U.S. Cl.
CPC .......... *G06F 1/1684* (2013.01); *G06F 1/1686* (2013.01); *H04M 1/026* (2013.01); *H04M 1/0264* (2013.01); *H04M 1/0266* (2013.01); *H04M 1/0277* (2013.01); *H04N 5/2251* (2013.01); *H04N 5/2257* (2013.01)
(58) Field of Classification Search
CPC .. H04M 1/0264; G06F 1/1624; G06F 1/1626; G06F 1/1684; G06F 1/1688; H04N 5/2251; H04N 5/2257
See application file for complete search history.

(56) References Cited

U.S. PATENT DOCUMENTS

| | | |
|---|---|---|
| 2013/0250525 A1 | 9/2013 | Wang |
| 2015/0118884 A1* | 4/2015 | Hu .................. H04B 1/3816 439/310 |
| 2015/0189175 A1 | 7/2015 | Fan et al. |
| 2017/0251131 A1 | 8/2017 | Wu et al. |
| 2018/0262663 A1 | 9/2018 | Zhang |

FOREIGN PATENT DOCUMENTS

| | | |
|---|---|---|
| CN | 104735177 A | 6/2015 |
| CN | 103533222 B | 8/2016 |
| CN | 106850896 A | 6/2017 |
| EP | 3211507 A1 | 8/2017 |

* cited by examiner

FUNCTIONAL DEVICE, ELECTRONIC APPARATUS, AND MOBILE TERMINAL

CROSS REFERENCE TO RELATED APPLICATIONS

This application claims priorities to Chinese Patent Application No. 201711055090.4, filed on Oct. 31, 2017, and Chinese Patent Application No. 201721433769.8, filed on Oct. 31, 2017, the contents of which are herein incorporated by reference in their entireties.

TECHNICAL FIELD

The described embodiments relate to electronic products, and in particular to a functional device, an electronic apparatus, and a mobile terminal.

BACKGROUND

With the development of electronic apparatuses, the electronic apparatuses having conventional configurations cannot meet the requirements of users. Thus, it is one of key goals for a researcher to design an electronic apparatus having diverse configurations and functions, in order to improve the user experience.

BRIEF DESCRIPTION OF THE DRAWINGS

In order to make the technical solution described in the embodiments of the present disclosure more clear, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

In order to more clearly understand the objective, the features and advantages of the present disclosure, the present disclosure will be described in details with reference to the drawings and the embodiments. It should be noted that, the embodiments and the features recited in the embodiments of the present disclosure may be combined with each other without confliction.

Plenty of specific details are described in the embodiments in order to better understand the technical solution of the present disclosure. However, the embodiments described here are only some exemplary embodiments, not all the embodiments. Based on the embodiments described in the present disclosure, one skilled in the art may acquire all other embodiments without any creative work. All these shall be covered within the protection scope of the present disclosure.

Further, the embodiments are described with reference to the accompanying drawings, in order to illustrate specific embodiments of the present disclosure that can be implemented. In the specification, it can be understood that, directional terms recited in the present disclosure, such as "top", "bottom", "upper", "lower", "front", "rear", "left", "right", "inner", "outer", "side", "above", "under", and the like, refer to the orientations in the accompanying drawings. Thus, the directional terms used here are only for better and more clearly describing and understanding the present disclosure, and are not intended to indicate or imply that the devices or the elements are disposed to locate at the specific directions or are structured and performed in the specific directions, which could not to be understood as limiting the present disclosure. In the present disclosure, unless specified or limited, otherwise, terms "mounted", "connected", "coupled", "disposed", "arranged", and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In addition, terms such as "first", "second", "third", and the like are used herein for purposes of description, and are not intended to indicate or imply relative importance or significance or to imply the number of indicated technical features. Thus, the feature defined with "first", "second", "third", and the like may include one or more of such a feature. In the description of the present disclosure, "a plurality of" means two or more, unless specified otherwise. Moreover, the terms "comprise", "include" or any other variations thereof are meant to cover non-exclusive including, so that the process, method, article or device comprising a series of elements do not only include those elements, but also include other elements that are not explicitly listed or also include the inherent elements of the process, method, article or device. In the case that there are no more restrictions, an element qualified by the statement "comprises a . . . " does not exclude the presence of additional identical elements in the process, method, article or device that includes the said element.

In the following, an electronic apparatus 100 provided in embodiments of the present disclosure will be described with reference to drawings.

The electronic apparatus 100 may include intelligent devices such as tablet PCs, mobile terminals, cameras, personal computers, laptops, in-vehicle devices, wearable equipment, and the like. It should be understood that "electronic apparatus 100" in the present disclosure may include, but be not limited to an apparatus receiving/transmitting communication signals via wired connection, for example, public switched telephone network (PSTN), digital subscriber line (DSL), digital cable, electric cable and/or another data connection/network, and/or cellular network, Wireless Area Networks (WLAN), digital television network such as DVB-H (Digital Video Broadcasting Handheld) network, satellite network, AM-FM broadcast transmitter and/or another communication terminal of wireless interface. The electronic apparatus may also include a satellite or cellular telephone, a personal communication system terminal with cellular radio telephone and data processing, facsimile and data communication, beeper, or other electronic apparatuses with a transceiver.

Figure 1:
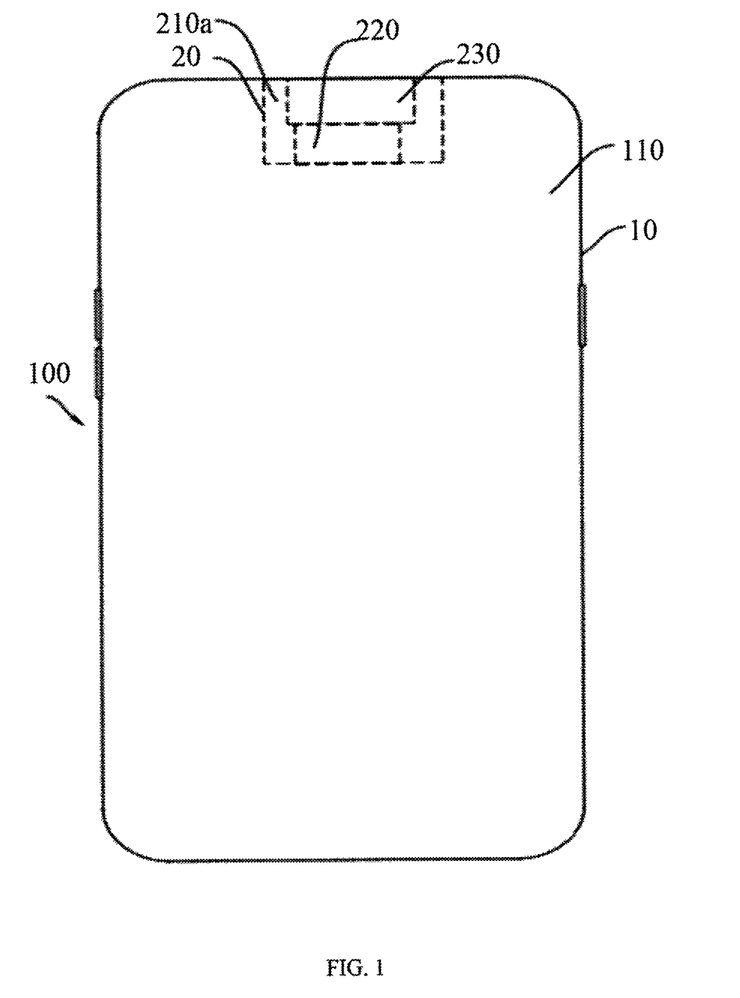
FIG. 1 is a schematic view of an electronic apparatus according to one embodiment of the present disclosure.
Figure 2:
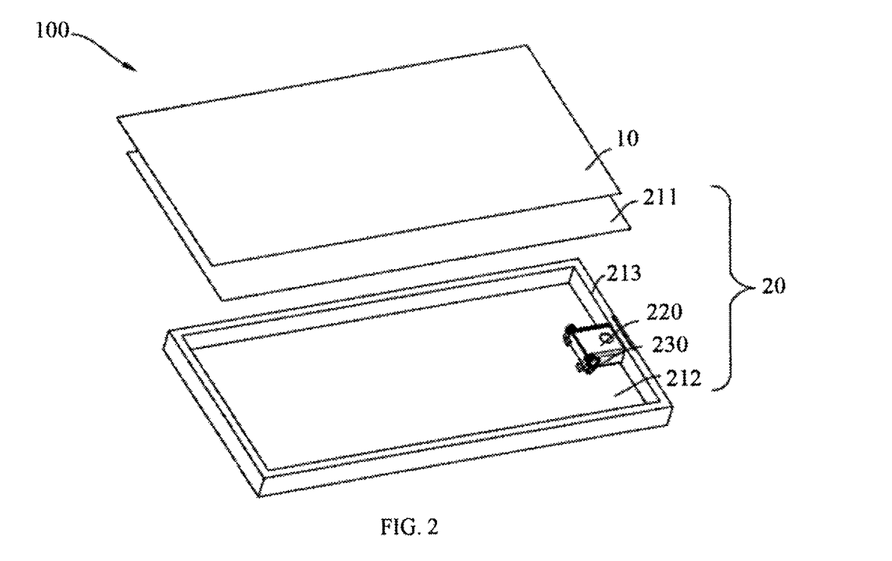
FIG. 2 is an exploded view of the electronic apparatus of FIG. 1.

FIG. 1 is a schematic view of an electronic apparatus 100 according to one embodiment of the present disclosure, and FIG. 2 is an exploded view of the electronic apparatus 100 of FIG. 1. Referring to FIGS. 1-2, the electronic apparatus may include a screen 10 and a functional device 20. In this embodiment, the screen 10 may have a display area 110 configured to display images and information. The functional device 20 may be disposed under the screen 10 and further connected to the screen 10, such that the screen 10 in this case may cover the functional device 20.

The screen 10, according to an exemplary embodiment, may include pixels formed from light-emitting diodes (LEDs), organic LEDs (OLEDs), plasma cells, electrowetting pixels, electrophoretic pixels, liquid crystal display (LCD) components, or other suitable pixel structures. A screen cover layer such as a layer of clear glass or plastic may cover the surface of the screen 10 or the outermost layer of the screen 10 may be formed from a color filter layer, thin-film transistor layer, or other display layer. In this embodiment, the screen 10 may further incorporate touch electrodes and be used as a touch screen for inputting information.

Figure 3:
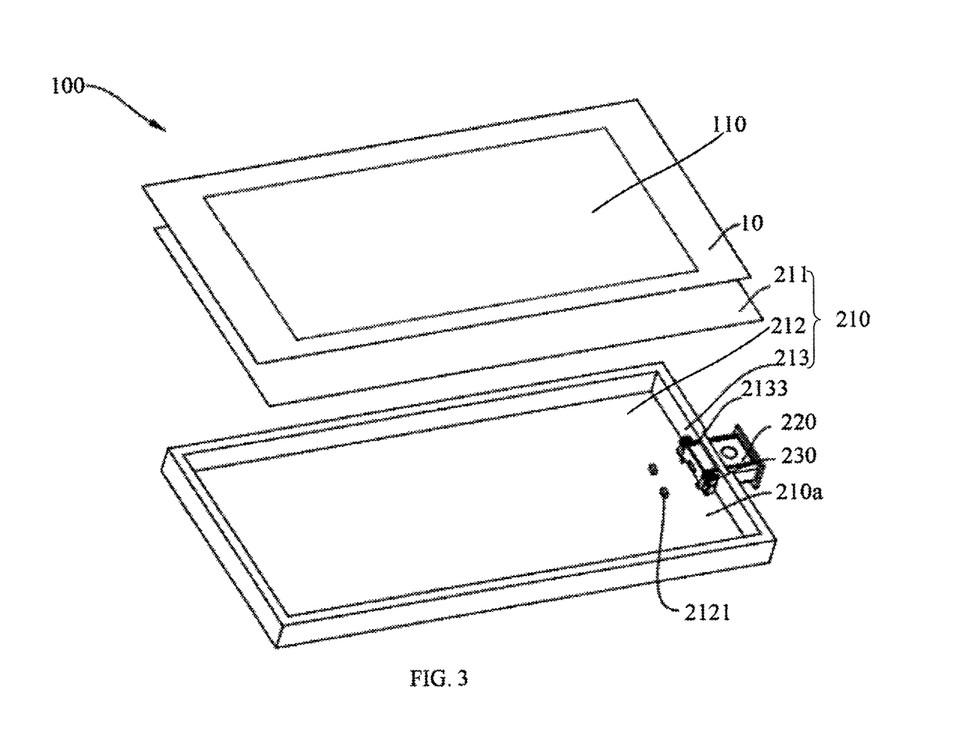
FIG. 3 is a schematic view of a functional device according to one embodiment of the present disclosure, wherein the functional component is in a first position.
Figure 4:
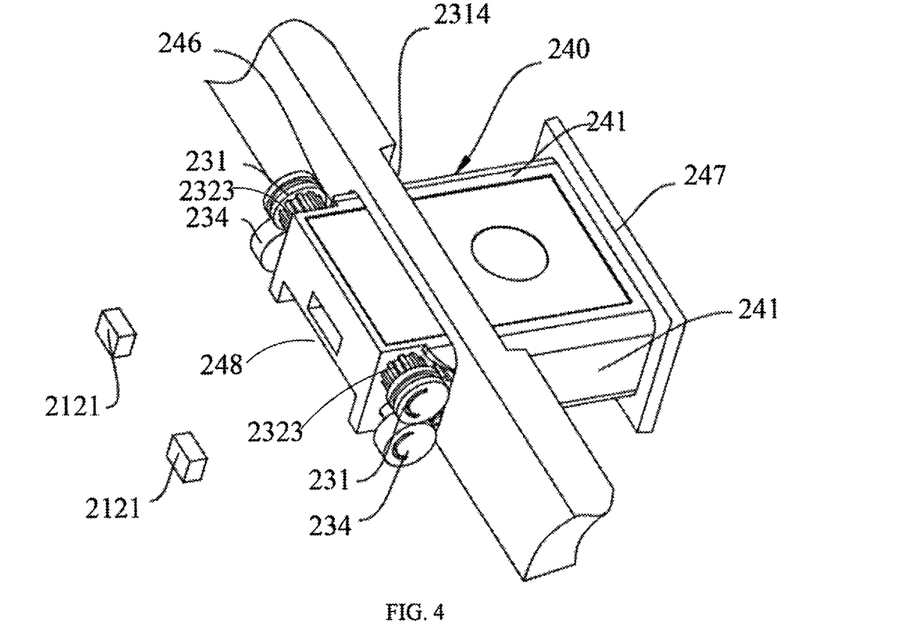
FIG. 4 is a partially enlarged view of FIG. 3.
Figure 5:
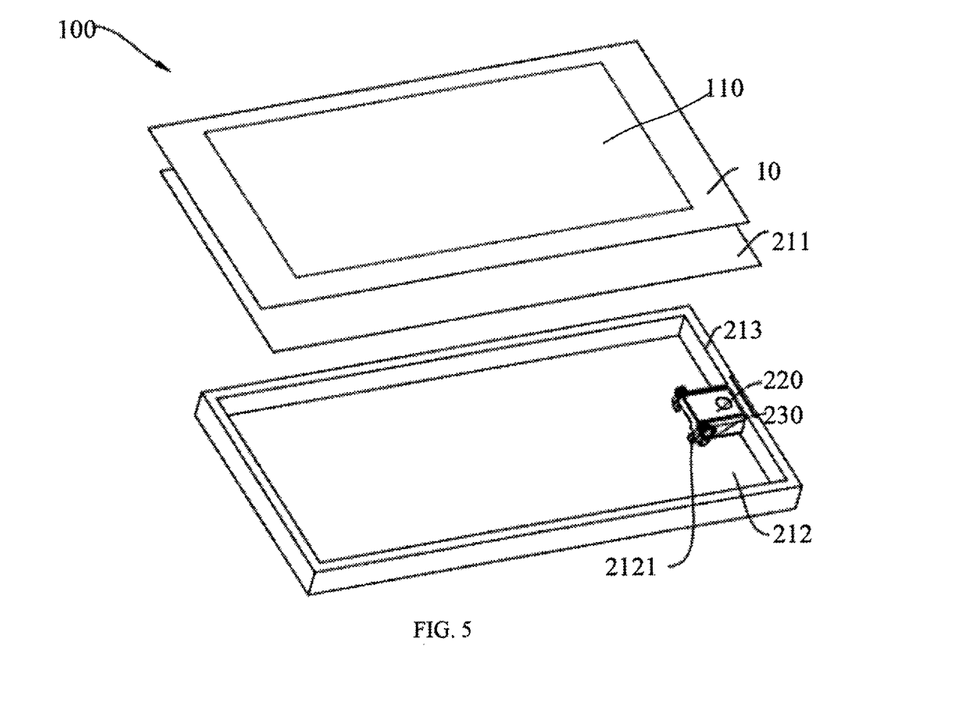
FIG. 5 is a schematic view of the functional device shown in FIG. 3, wherein the functional component is in a second position.
Figure 6:
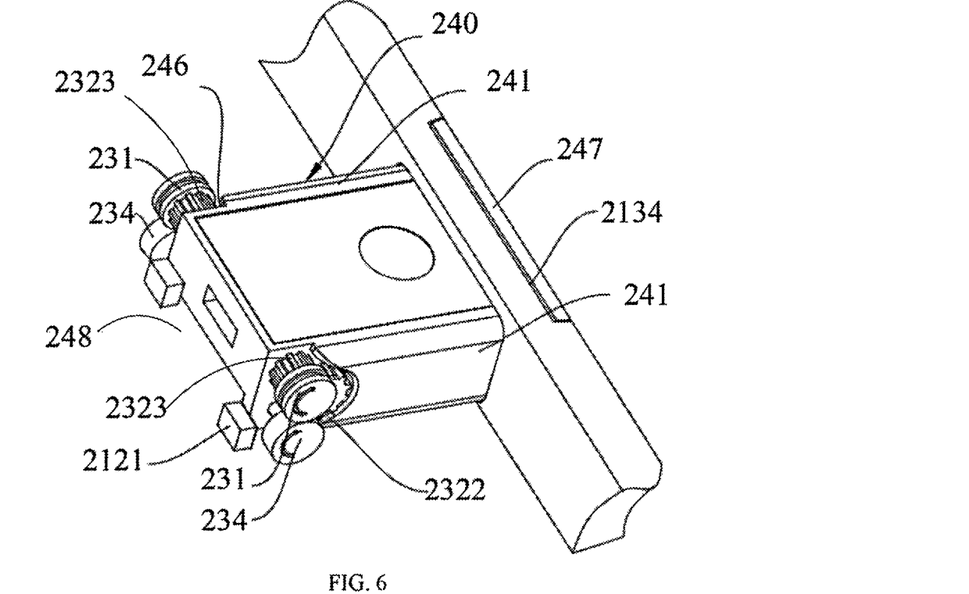
FIG. 6 is a partially enlarged view of FIG. 5.

FIGS. 3 and 5 are schematic views of the functional device 20 in two different states according to one embodiment of the present disclosure. FIG. 4 is a partially enlarged view of FIG. 3, while FIG. 6 is a partially enlarged view of FIG. 5. Referring to FIGS. 3-6, the functional device 20 may include a housing 210 disposed under the screen 10 and covered by the screen 10, a functional component 220 disposed in the housing 210 and movable relative to the housing 210, and a driving mechanism 230 received in the housing 210 and configured to drive the functional component 220 to move. The functional component 220 can be called as a slidable device in the present disclosure.

More specifically, the functional component 220 may be movable between a first position and a second position. Referring to FIGS. 3-4 and combining with FIG. 2, when being in the first position, the functional component 220 extends out of the housing 210, and can be seen from an outside of the electronic apparatus 100. However, referring to FIGS. 5-6 and combining with FIG. 2, when being in the second position, the functional component 220 retracts into the housing 210 and further received in the housing 210, such that the functional component 220 is hided under the screen 10 and cannot be seen from the outside of the electronic apparatus 100. In this way, it is possible to achieve a diversity of usages of the electronic apparatus, and improve the user experience. Optionally, when being in the second position, the functional component 220 may be disposed under the display area 110 of the screen 10, such that the functional component 220 may be covered by the display area 110 of the screen 10.

Furthermore, since the functional component 220 is disposed in the housing 210 and under the screen 10, the functional component 220 may no longer occupy any space of the display area 110, such that the display area 110 can be designed as large as possible, and thus a ratio of the display area 110 to a total area of the screen 10 is increased, which means a screen-to-body ratio may be increased.

In an alternative embodiment, referring to FIGS. 2 and 3, the housing 210, which may also be called as an enclosure or a back shell, may include a top plate 211 disposed under the screen 10, a bottom plate 212 spaced from and opposite to the top plate 211, and a side plate 213 surrounding the bottom plate 212 and respectively connected to the top plate 211 and the bottom plate 212. In this embodiment, the housing 210 may define a chamber 210a in order to receive the functional component 220 and the driving mechanism 230. The chamber 210a may be enclosed by the top plate 211, the bottom plate 212 and the side plate 213.

Figure 7:
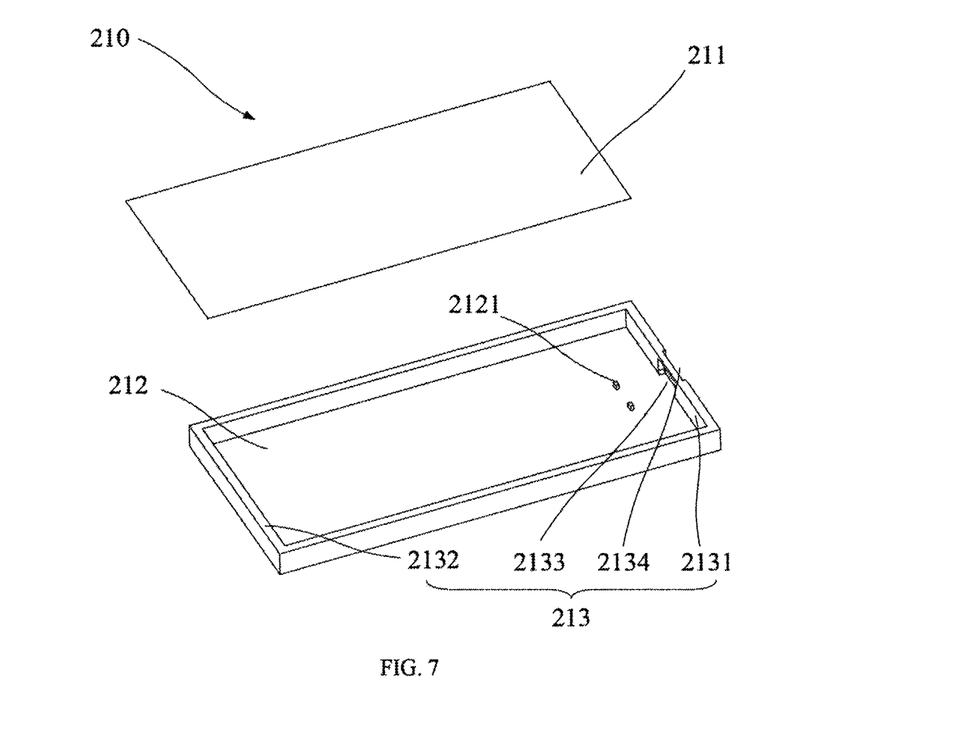
FIG. 7 is a schematic view of the housing according to one embodiment of the present disclosure.

FIG. 7 illustrates a schematic view of the housing according to one embodiment of the present disclosure. As shown in FIG. 7, the side plate 213 may be substantially in shape of a rectangle, and include a first housing wall 2131, a second housing wall 2132 opposite to the first housing wall 2131, and two third opposite housing walls (not labeled) connecting the first housing wall 2131 and the second housing wall 2132. In this case, a first through hole 2133 may be defined in the first housing wall 2131 of the side plate 213. The functional component 220 may face the first through hole 2133, and extend out of the housing 210 or retract back into the housing 210 via the first through hole 2133.

In the embodiment shown in FIG. 7, the side plate 213 is in shape of a rectangle. However, in other embodiments, the side plate 213 may also be in other shape, such as circle, ellipse, square, and the like.

The functional component 220 may include, but be not limited to, at least one component selecting from a group including a camera module, a receiver module, an LED flash, and a sensor. In an alternative embodiment, the functional component 220 may be a camera module. Taking the functional component 220 as a front-facing camera module for example, referring to FIG. 2, the front-facing camera module may be disposed in the housing 210 and hided under the screen 10. As shown in FIGS. 3-4, when the front-facing camera module is driven to extend out of the housing 210 via the first through hole 2133, an image taking function may be achieve as a result. Besides, the front-facing camera will not occupy the space of the screen 10, and it is unnecessary to define a hole for the front-facing camera on a glass substrate of the screen 10. In this way, a ratio of the display area 110 to an area of the screen 10 may be increased, and manufacturing processes of the screen 10 may be reduced. After finishing taking images, as shown in FIGS. 5-6, the driving mechanism 230 may drive the front-facing camera to retract into the housing 210 via the first through hole 2133, and thus the front-facing camera may be protected from being impacted, damaged, eroded by water or dust, and the like.

Figure 8:
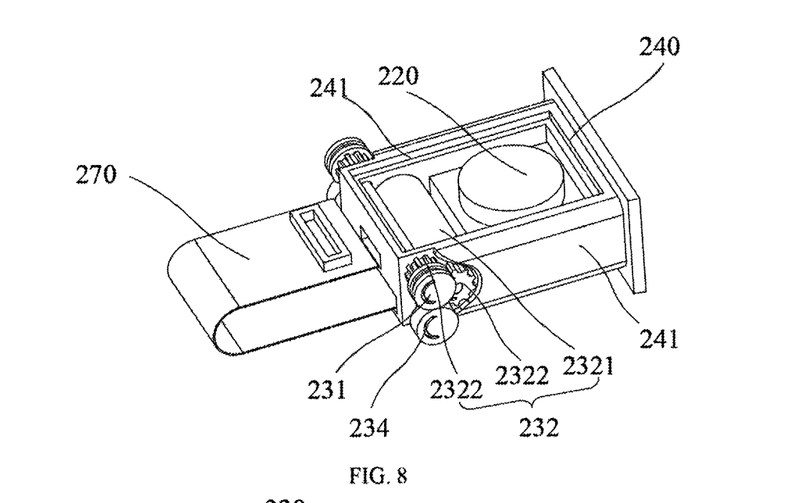
FIG. 8 is a partial view of the functional device shown in FIG. 1.
Figure 9:
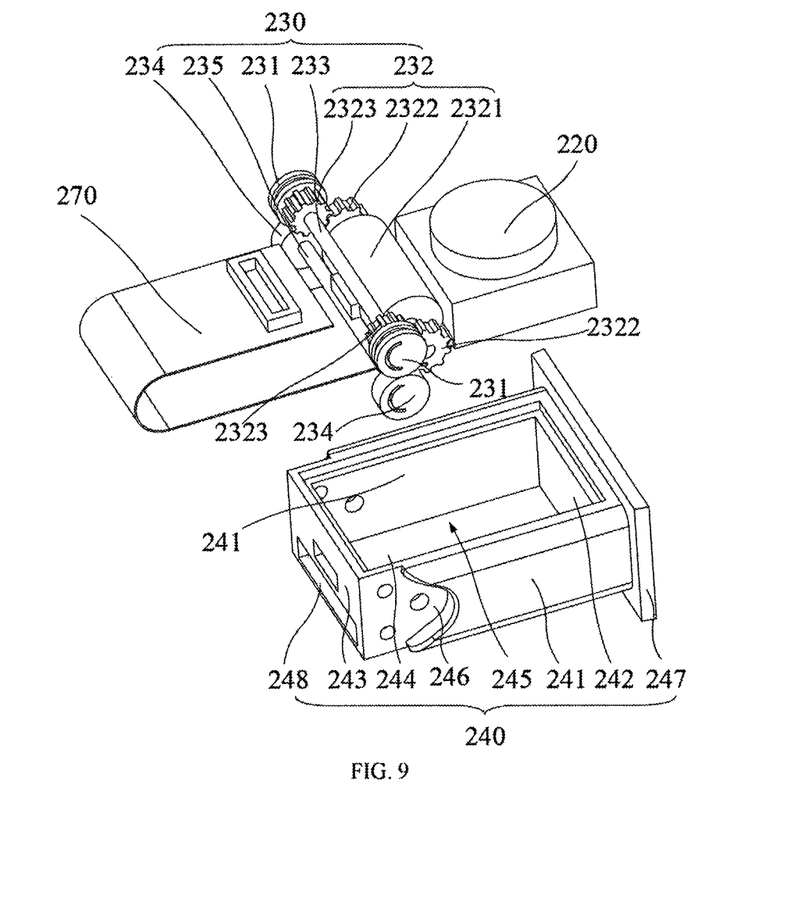
FIG. 9 is an explored view of FIG. 8.

As shown in FIGS. 8-9, the driving mechanism 230 may include a first wheel 231 connected to the functional component 220, and a driving assembly 232 connected to the first wheel 231 and configured to drive the first wheel 231 to rotate. The first wheel 231 may abut against an inner wall of the housing 210, and rotatable relative to the housing 210 when driven by the driving assembly 232; the first wheel 231 may in turn drive the functional component 220 to move between the first position and the second position, that is, to extend out of the housing 210 or retract into the housing 210 via the first through hole 2133.

In this embodiment, the functional component 220 and the driving mechanism 230 are arranged in the housing 210, and friction forces may be generated between the driving mechanism 230 and the inner wall of the housing 210. The friction forces may drive the functional component 220 to extend out of the housing 210 or retract into the housing 210. When the functional component 220 is not in use, the functional component 220 may be hided inside the housing 210 and cannot be seen from the outside of the electronic apparatus 100. When the functional component 220 is desired to be used, the functional component 220 may be driven to extend out of the housing 210 for use. Therefore, the functional component 220 may not occupy the space of the display area 110 on the screen 10 of the electronic apparatus 100, and thus the ratio of the display area to the total area of the screen may be increased, the operation of the electronic apparatus may be convenient, and the user experience may be improved.

Combining with FIGS. 3 and 5, more specifically, the first wheel 231 may be located between the top plate 211 and the bottom plate 212, and contact with at least one of the top plate 211 and the bottom plate 212. A friction may be generated between the first wheel 231 and at least one of the top plate 211 and the bottom plate 212, such that the first wheel 231 may rotate and move relative to the housing 210, thereby driving the functional component 220 to move between the first position and the second position.

It should be noted that, in this embodiment, the functional component 220 may move relative to the housing 210 by using the first wheel 231, rather than being embedded or engaged into the housing 210. Besides, the first wheel 231 may contact with the housing 210 by a surface contact. In this way, when the electronic apparatus 100 is falling, or when the functional component 220 is impacted, an impact force may act on the functional component 220. When the impact force is greater than a maximum static friction force generated between the first wheel 231 and the housing 210, the first wheel 231 may move relative to the housing 210. In this case, on one hand, parts of the impact force may be offset, in order to reduce the damage to the functional component 220. On the other hand, the first wheel 231 may move relative to the housing and retract into the housing 210, in order to prevent the functional component 220 from being exposed outside the housing 210 and further damaged. Therefore, when using the first wheel 231 to achieve the movement of the functional component 220 relative to the housing 210, it is possible to offset the impact force and protect the functional component 220 when the electronic apparatus 100 is falling or when the functional component 220 is impacted, thereby improving a reliability of the electronic apparatus 100 and extending a service life of the electronic apparatus 100.

Figure 10:
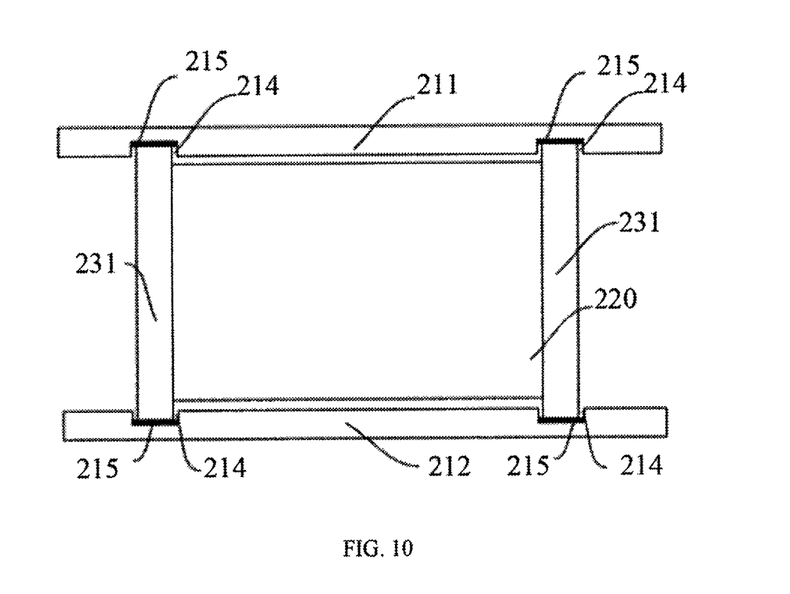
FIG. 10 is a plan view of a functional device according to another embodiment of the present disclosure.

Alternatively, referring to FIG. 10, at least one of the top plate 211 and the bottom plate 212 may have a guiding rail 214 arranged thereon. The guiding rail 214 may extend in a direction substantially parallel to a moving direction of the functional component 220. The first wheel 231 may be rotatable and movable along the guiding rail 214. In this case, the guiding rail 214 may be configured to provide a guiding direction for the movement of the first wheel 231 towards or away from the first housing wall 2131 of the side plate 213. Meanwhile, the first wheel 231 may be engaged into the guiding rail 214, and the guiding rail 214 may ensure the orientation of the first wheel 231. Thus, when the electronic apparatus 100 is impacted, it is possible to avoid the changing of the orientation of the first wheel 231. In this way, the misalignment between the functional component 220 and the first through hole 2133 or the hindrance to the functional component 220 from extending out of the housing 210 via the first through hole 2133 due to the change of the orientation of the first wheel 231 may be avoided. Therefore, the guiding rail 214 may drive the functional component 220 to extend out of the housing 210 via the first through hole 2133 successfully, and the resistance caused by the movement of the functional component 220 may be reduced.

In this embodiment, the friction force may be generated between the first wheel 231 and the housing 210. The friction force may provide a driving force for the movement of the first wheel 231 relative to the housing 210. Therefore, in order to increase the friction force between the first wheel 231 and the housing 210, a specific embodiment is further provided in the present disclosure. It should be understood that, the protection scope of the present disclosure may include, but be not limited to the protection scope described in the following embodiments.

In an alternative embodiment, referring to FIG. 10, the functional device 20 may further include a damper 215 arranged in the guiding rail 214. More specifically, the damper 215 may be arranged on a surface of the guiding rail 214 that contacts with the first wheel 231. The damper 215 may be configured to increase the friction force generated between the first wheel 231 and an inner wall of the guiding rail 214.

In an alternative embodiment, the damper 215 may include, but be not limited to an anti-slip film adhered on the guiding rail 214. The anti-slip film may be made from materials including but not limited to plastics, rubbers, and the like. Alternatively, the damper 215 may further include a roughness structure arranged on the inner wall of the guiding rail 214. The roughness structure may be a concavo-convex structure including such as concavo bumps and convex bumps, and the like.

Figure 11:
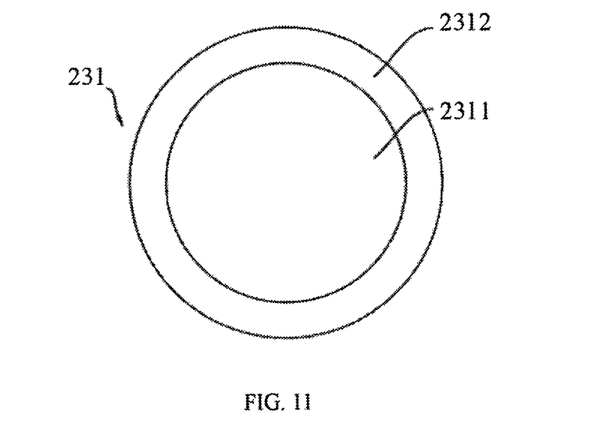
FIG. 11 is a plan view of the first wheel according to one embodiment of the present disclosure.

In an alternative embodiment, referring to FIG. 11, the first wheel 231 may further include an inner ring 2311 and an outer ring 2312 sleeved at a periphery of the inner ring 2311. In this embodiment, the inner ring 2311 may be made of rigid material and configured to support the outer ring 2312. The outer ring 2312 may be made of anti-slip material. The anti-slip material may include, but be not limited to plastics, rubbers, and the like.

In an alternative embodiment, referring back to FIGS. 8-9, the driving mechanism 230 may include a pair of first wheels 231 and a first shaft 233 connected between the pair of first wheels 231. In this embodiment, the pair of first wheels 231 may be located at two opposite sides of the functional component 220, such that the functional component 220 may move more stably. The first shaft 233 may be further connected to the functional component 220, in order to drive the functional component 220 to move between the first position and the second position.

In this embodiment, two first wheels are provided. However, in other embodiments, it is possible to provide one first wheel, three, four or more first wheels. The number of the first wheels may not be limited in the present disclosure.

In an alternative embodiment, referring to FIGS. 8-9, at least one first wheel 231 may be connected to the driving assembly 232, such that the at least one first wheel 231 may be driven to rotate. In one embodiment, only one first wheel may be connected to the driving assembly 232, and further drive the other first wheel to rotate via the first shaft 233 connected between the pair of first wheels. However, in other embodiment, for example, referring to FIG. 9, it is also possible that the pair of first wheels are both connected to the driving assembly 232.

More specifically, the driving assembly 232 may be an electric actuator, a pneumatic actuator, and the like. In this embodiment, as shown in FIGS. 8-9, the driving assembly 232 may be implemented as an electric actuator, and substantially include a motor 2321, a first gear 2322 and a second gear 2323. More specifically, the motor 2321 may have an output shaft (not labeled). The first gear 2322 may be sleeved on the output shaft of the motor 2321 and rotatable along with the output shaft. The second gear 2323 may be sleeved on the first shaft 233 and further engaged with the first gear 2322. In this way, during the operation of the motor 2321, the motor 2321 may drive the first gear 2322 to rotate, and the first gear may in turn drive the second gear 2323 to rotate. In this way, the first shaft 233 and the pair of first wheels 231 are driven to rotate, and thus the functional component 220 may be driven to move between the first position and the second position. In this embodiment, it is possible to provide two first gears 2322 respectively on two opposite sides of the output shaft of the motor 2321, and provide two second gears 2323 at two opposite sides of the first shaft 233. Thus, the pair of first wheels are both connected to the driving assembly 232.

In this embodiment, the motor 2321 may drive the pair of first wheels 231 to rotate by means of a gear drive device. However, in other embodiment, it is also possible that the motor 2321 may drive the pair of first wheels 231 to rotate by means of a chain drive device, a belt drive device, and the like. The drive device used in the present disclosure may not be limited here.

Referring back to FIGS. 4 and 6, during the rotation, the friction forces may be generated between the pair of first wheels 231 and the housing 210. The friction forces may drive the pair of first wheels 231 to move in a direction towards or away from the first housing wall 2131, and thus the first shaft 233 connected between the pair of the first wheels 231 may drive the functional component 220 to move in the direction towards or away from the first housing wall 2131, pass through the first through hole 2133, and further extend out of the housing 210 (as shown in FIG. 4) or retract into the housing 210 (as shown in FIG. 6).

The position of each first wheel 231 relative to the functional component 220 may not be specifically limited here. For example, in one embodiment, the first wheel 231 may be arranged at one side of the functional component 220 that is closer to the second housing wall 2132. In another embodiment, the first wheel 231 may also be arranged between the functional component 220 and the side plate 213. In a further embodiment, the first wheel 231 may also be arranged between the functional component 220 and the top plate 211 or the bottom plate 212, and the like.

In this embodiment, as shown in FIGS. 4 and 6, the pair of first wheels 231 are arranged at one side of the functional component 220 that is closer to the second housing wall 2132. In this way, the driving mechanism 230 may push the functional component 220 to move out of the housing 210, or drag the functional component 220 to retract into the housing 210. A rotating surface of each first wheel 231 may abut against both the top plate 211 and the bottom plate 212, such that the pair of first wheels 231 are sandwiched between the top plate 211 and the bottom plate 212, and that the functional component 220 may be located between the top plate 211 and the bottom plate 212.

In this embodiment, referring to FIGS. 3 and 8, one end of the functional component 220 may be supported by the pair of the first wheels 213, and the other end of the functional component 220 may abut against an inner wall defining the first through hole 2133 of the first housing wall 2131. In this way, the functional component 220 may be avoided from contacting with the top plate 211 and the bottom plate 212. Thus, the resistance to the movement of the functional component 220 may be reduced.

In this embodiment, the first wheel 231 may be slightly pressed by the top plate 211 and the bottom plate 212, in order to prevent the first wheel 231 from idle rotating.

In an alternative embodiment, referring to FIGS. 8-9, the driving mechanism 230 may further include a pair of second wheels 234, and a second shaft 235 connected between the pair of second wheels 234. In this embodiment, the pair of first wheels 231 may respectively abut against the top plate 211. The pair of second wheels 234 may respectively abut against the bottom plate 212 and the pair of first wheels 231. In this way, the second wheels 234 may contact with the pair of first wheels 231 by surface contact and be rotatable along with the pair of first wheels 231.

In this embodiment, a pair of drive wheels (first wheels 231) and a pair of follower wheels (second wheels 232) are provided on two opposite sides of the functional component 220. The pair of drive wheels abut against one of the top plate 211 and the bottom plate 212, while the pair of follower wheels abut against the other of the top plate 211 and the bottom plate 212. In this way, compared with the embodiment having only one pair of drive wheels, the present embodiment may reduce the sizes of the wheels, and thus the space occupied by the wheels may also be reduced. Certainly, more than two drive wheels and more than two follower wheels may also be provided at two opposite sides of the functional component 220.

In this embodiment, each second wheel 234 may be driven to rotate along with the first wheel 231 since each second wheel 234 contacts with the first wheel 231 by the surface contact. However, in other embodiments, the pair of second wheels 234 may not abut against the pair of first wheels 231. For example, it is also possible to provide another driving motor to drive the pair of second wheels 234 to rotate.

In an alternative embodiment, referring to FIGS. 4, 6 and 9, the functional device 20 may further include a holder 240 passing through the first through hole 2133 and movable relative to the housing 210, in particular to the side plate 213. A shape of the holder 240 may match with that of the first through hole 2133, such that the holder 240 may stably move in the first through hole 2133 without shaking.

In this embodiment, referring to FIGS. 8 and 9, the holder 240 may be substantially in shape of a rectangular frame, and include a pair of first side walls 241, a second side wall 242, a third side wall 243 and a bottom wall 244. More specifically, the pair of first side walls 241 may be located opposite to each other, and extend in a direction substantially parallel to the moving direction of the functional component 220. The second side wall 242 and the third side wall 243 may be connected between the pair of first side walls 241. The bottom wall 244 may be respectively connected to the pair of first side walls 241, the second side wall 242, and the third side wall 243. In this embodiment, the third side wall 243 may be always located in the housing 210 during the movement of the holder 240. A distance between the second side wall 242 and the second housing wall 2132 is larger than a distance between the third side wall 243 and the second housing wall 2132.

Furthermore, as shown in FIGS. 8-9, a receiving cavity 245 may be defined by the pair of first side walls 241, the second side wall 242, the third side wall 243 and the bottom wall 244. The receiving cavity 245 may have an opening facing towards the top plate 211. The functional component 220 may be received in the receiving cavity 245 of the holder 240 and movable together with the holder 240. That is to say, the functional component 220 may be enclosed by the holder 240. The driving assembly 232 may be fixed to the holder 240. More specifically, the functional component 220 may be near the second side wall 242. The motor 2321 may be received in the receiving cavity 245 of the holder 240, and the output shaft of the motor 2321 may pass through the pair of first side walls 241 of the holder 240. In this embodiment, the first gear 2322 may be located at the outside of the holder 240.

The first shaft 233 may be located at one side of the functional component 220 that is close to the third side wall 243, and further pass through the pair of first side walls 241. The pair of first wheels 231 may be located at two opposite sides of the holder 240, and rotatable relative to the holder 240. The pair of second wheels 234 may also be located at two opposite sides of the holder 240, abut against the pair of first wheels 231, and rotatable along with the pair of first wheels 231 relative to the holder 240. In this case, the pair of first wheels 231 and the pair of second wheels 234 may all protrude out from external surfaces of the first side walls 241, such that the pair of first wheels 231 and the pair of second wheels 234 may abut against an inner surface of the first housing wall 2131 when the functional component 220 is in the first position.

The second gear 2323 may also be located at the outside of the holder 240, and may be positioned between the first side wall 241 and the corresponding first wheel 231.

In an alternative embodiment, referring to FIGS. 4 and 6, each first side wall 241 has a notch 246 recessed from the external surface thereof. The first gear 2321, the second gear 2322, one first wheel 231 and one second wheel 234 may be disposed in the notch 246 on one first side wall 241. The other first wheel 231 and the other second wheel 234 may be disposed in the notch 246 on the other first side wall 241.

In an alternative embodiment, referring to FIGS. 4 and 6, the holder 240 may further include a baffle 247 located at an outside of the housing 210 and adjacent to the second side wall 242. The baffle 247 may be configured to cover the first through hole 2133 when the functional component 220 is in the second position. More specifically, a recess 2134 configured to receive the baffle 247 may be recessed from an external surface of the first housing wall 2131. The recess 2134 may be further communicated with the first through hole 2133. During the movement of the holder 240 and the functional component 220, when the functional component 220 is in the first position, the pair of first wheels 231 may move to abut against the inner surface of the first housing wall 2131 of the side plate 213, and the functional component 220 may thus extend out of the housing 210. However, when the functional component 220 is in the second position, the baffle 247 may be engaged in the recess 2134 and abut against the first housing wall 2131, and the functional component 220 may retract into the housing 210 such that the functional component 220 is completely received in the housing 210. In this case, when the functional component 220 is in the second position, the outmost surface of baffle 247 and that of the first housing wall 2131 are at the same level.

In the embodiment described above, a recess is defined in the first housing wall 2131. However, in other embodiment, it is also possible that no recess is provided. When the functional component 220 is in the second position, the baffle 247 is received in the first through hole 2133, and the outmost surface of baffle 247 and that of the first housing wall 2131 are at the same level.

Alternatively, referring back to FIGS. 3 and 5, a protrusion 2121 may be protruded from the bottom plate 212. The protrusion 2121 may be arranged between the first housing wall 2131 and the second housing wall 2132, and configured to stop the holder 240. When the baffle 247 is engaged in the recess 2134 and abuts against the first housing wall 2131, the third side wall 243 of the holder 240 may abut against the protrusion 2121. In this embodiment, two protrusions 2121 may be provided on the bottom plate 212. However, in other embodiment, it is also possible to provide one protrusion, or at least three protrusions. The number of the protrusions may not be limited in the present disclosure.

Figure 12:
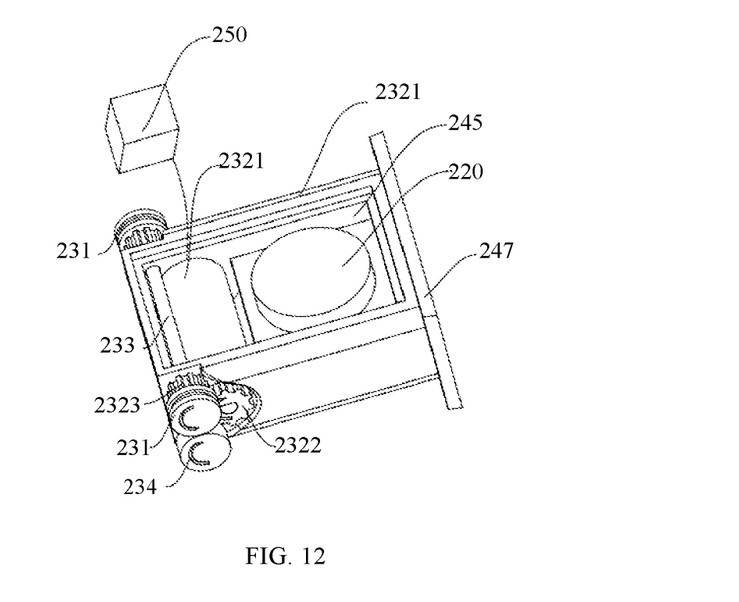
FIG. 12 is a partial view of a functional device according to a further embodiment of the present disclosure.

Alternatively, referring to FIG. 12, the functional device 20 may further include a controller 250. The controller 250 may be electrically connected to the motor 2321, and configured to control the operation of the motor 2321 which in turn drives the pair of first wheels 231 to rotate. When the pair of first wheels 231 abut against the first housing wall 2131, or when the baffle 247 abuts against the first housing wall 2131, the controller 250 may control the motor 2321 to stop working.

Figure 13:
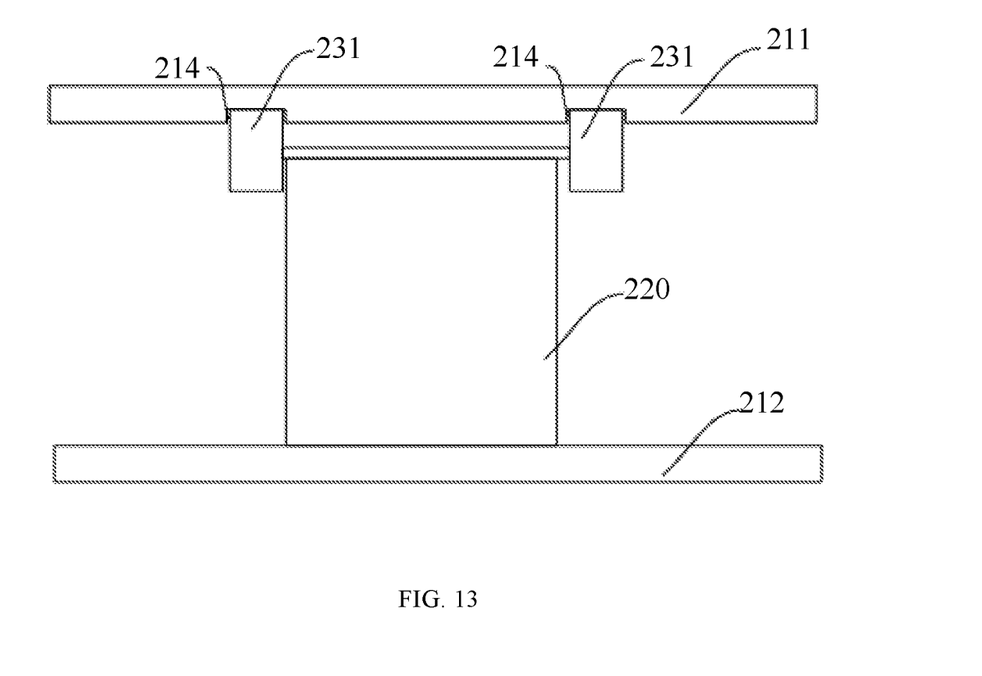
FIG. 13 is a plan view of a functional device according to a still further embodiment of the present disclosure.

In the embodiment described above, the driving mechanism 230 includes a pair of first wheels 231 and a pair of second wheels 234. However, in other embodiment, it is also possible that the driving mechanism 230 includes only a pair of first wheels 231. For example, in an alternative embodiment, referring to FIG. 13, the functional component 220 may have two opposite ends, one end of which is provided with the pair of first wheels 231 both abut against the top plate 211. The other end of the functional component 220 may be slidably connected to the bottom plate 212.

Figure 14:
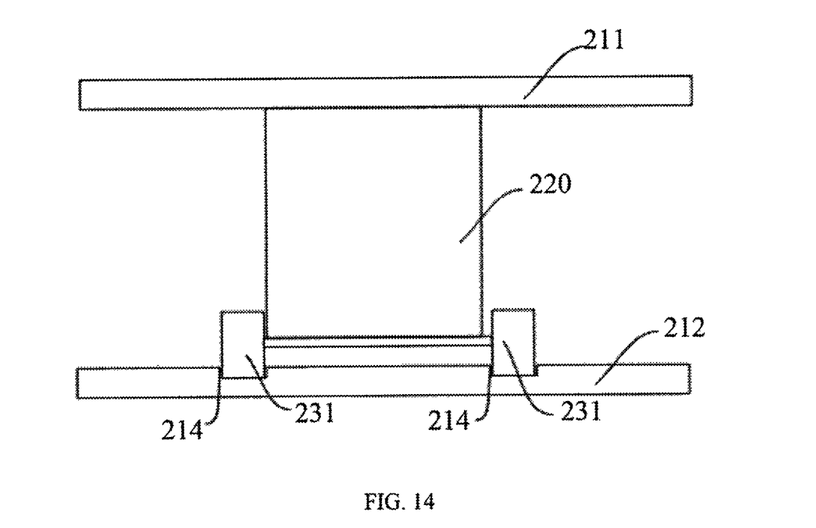
FIG. 14 is a plan view of a functional device according to a still further embodiment of the present disclosure.

In another embodiment, referring to FIG. 14, one end of the functional component 220 may be provided with the pair of first wheels 231 both abut against the bottom plate 212. The other end of the functional component 220 may be slidably connected to the top plate 211.

Figure 15:
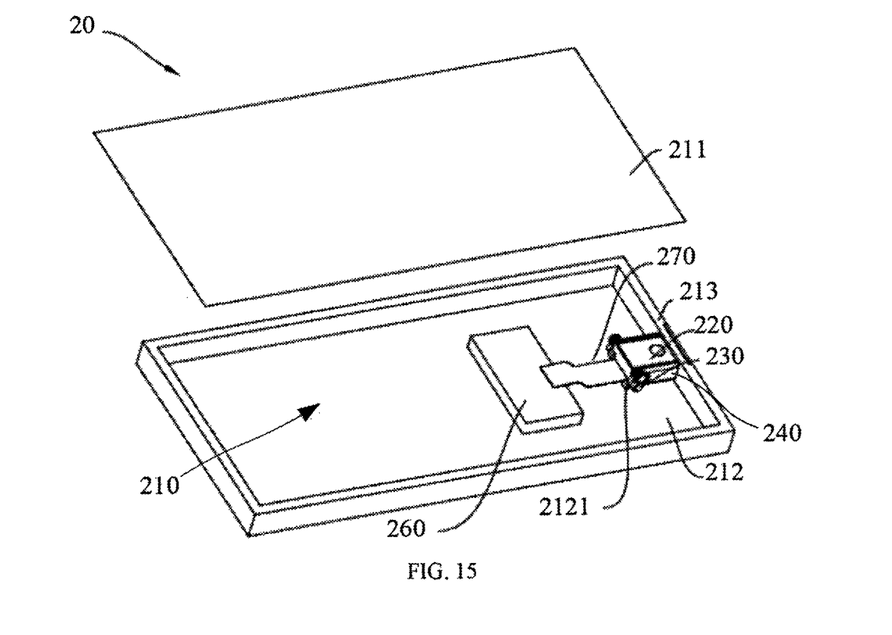
FIG. 15 is a plan view of a functional device according to a still further embodiment of the present disclosure.

FIG. 15 a plan view of a functional device 20 according to a still further embodiment of the present disclosure. In this embodiment, the functional component 220 may be the camera module.

In an alternative embodiment, referring to FIG. 15, the functional device 20 may further include a main board 260 and a flexible printed circuit 270 received in the housing 210. In this embodiment, the main board 260 may be fixedly connected to the housing 210. The flexible printed circuit 270 may be electrically connected to the camera module and the main board 260.

In an alternative embodiment, referring to FIGS. 9 and 15, the third side wall 243 opposite to the baffle 247 may have a second through hole 248 defined therein. The main board 260 may be located inside the chamber 210a and outside the holder 240. One end of the flexible printed circuit 270 may be located in the receiving cavity 245 of the holder 240, and connected to the camera module. The other end of the flexible printed circuit 270 may extend out of the holder 240 via the second through hole 248 and may be further connected to the main board 260.

Figure 17:
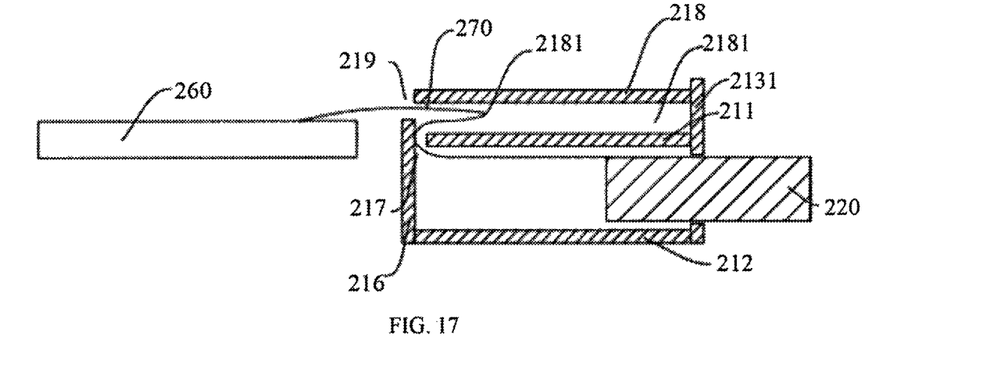
FIG. 17 is a partial cross-section view of a functional device according to a still further embodiment of the present disclosure.

In an alternative embodiment, referring to FIGS. 17 and 18, the housing 210 may further include a partition wall 216 fixedly connected to the bottom plate 212, and located between the first housing wall 2131 and the second housing wall 2132. The driving mechanism 230 and the functional component 220 may be located between the partition wall 216 and the first housing wall 2133. The main board 260 may be located between the partition wall 216 and the second housing wall 2132. A first gap 217 may be defined between the top plate 211 and the partition wall 216. One end of the flexible printed circuit 270 may be electrically connected to the camera module. The other end of the flexible printed circuit 270 may extend out via the first gap 217, and may be further electrically connected to the main board 260.

Figure 16:
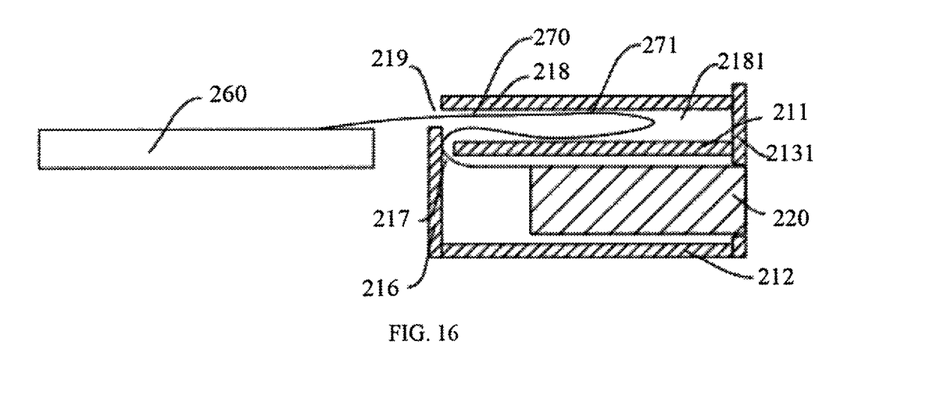
FIG. 16 is a partial cross-section view of a functional device according to a still further embodiment of the present disclosure.

In an alternative embodiment, referring to FIGS. 16 and 17, the housing 210 may further include a cover 218 located at one side of the top plate 211 that is opposite to the bottom plate 212. A receiving space 2181 may be defined between the cover 218 and the top plate 211, and a second gap 219 may be defined between the cover 218 and the partition wall 216. The flexible printed circuit 270 may successively pass through the first gap 217, the receiving space 2181 and the second gap 219, and may be further electrically connected to the main board 260.

In an alternative embodiment, referring to FIGS. 16 and 17, the flexible printed circuit 270 may include a curved portion 271 received in the receiving space 2181. When the camera module is extending out of the housing 210, the curved portion 271 received in the receiving space 2181 is stretchable along with the movement of the camera module, and thus a length of the curved portion 271 of the flexible printed circuit 270 received in the receiving space 2181 may be gradually reduced. However, when the camera module is retracting into the housing 210, the camera module may push the flexible printed circuit 270 in a direction towards the partition wall 216, and the length of the curved portion 271 of the flexible printed circuit 270 received in the receiving space 2181 may be gradually increased. In this way, the flexible printed circuit 270 may be received in the receiving space 2181, and the space occupied by the flexible printed circuit 270 may be reduced. Therefore, it is possible to prevent the flexible printed circuit 270 from being scraped by hard material, or prevent a short of the flexible printed circuit 270 from occurring.

In this embodiment, the functional component 220 and the driving mechanism 230 are arranged in the housing 210, and friction forces may be generated between the driving mechanism 230 and at least one of the top plate 211 and the bottom plate 212. The friction forces may drive the functional component 220 to extend out of the housing 210 or retract into the housing 210. When the functional component 220 is not in use, the functional component 220 may be hided inside the housing 210 and cannot be seen from the outside of the electronic apparatus 100. When the functional component 220 is desired to be used, the functional component 220 may be driven to extend out of the housing 210 for use. Therefore, the functional component 220 may not occupy the space of the display area 110 on the screen 10 of the electronic apparatus 100, and thus the ratio of the display area to the total area of the screen may be increased, the operation of the electronic apparatus may be convenient, and the user experience may be improved.

In addition, the functional component 220 may be movable relative to the housing 210 by using the first wheel 231. In this way, it is possible to offset the impact force and protect the functional component 220 when the electronic apparatus 100 is falling or when the functional component 220 is impacted, thereby improving the reliability of the electronic apparatus 100 and extending the service life of the electronic apparatus 100.

An electronic apparatus is further provided in the present disclosure. The electronic apparatus may include: an enclosure, a screen engaged with the enclosure to define a chamber, a slidable device movable between a first position at which the slidable device extends out of the chamber and a second position at which the slidable device retracts into the chamber and covered by the screen, and a driving mechanism, received in the chamber.

The driving mechanism may include a first wheel and a driving assembly. The first wheel may be connected to the slidable device, abutting against an inner wall of the enclosure that forms the chamber, and rotatable relative to the enclosure to drive the slidable device to move between the first position and the second position. The driving assembly may be connected to the first wheel and configured to drive the first wheel to rotate.

In one embodiment, the electronic apparatus may include a holder movable relative to the enclosure; wherein the slidable device may be received in the holder and moves with the holder, and the driving assembly may be fixed to the holder. The enclosure may include a top plate and a bottom plate which are spaced from and opposite to each other, and a side plate respectively connected to the top plate and the bottom plate. The driving mechanism may include a pair of first wheels, a pair of second wheels contacting with the pair of first wheels and rotatable with the pair of first wheels, a first shaft connected between the pair of first wheels, and a second shaft connected between the pair of second wheels.

In this embodiment, the pair of first wheels may abut against the top plate, while the pair of second wheels may abut against the bottom plate. The pair of first wheels may be located at two opposite sides of the holder, and the first shaft may pass through the two opposite sides of the holder. At least one of the pair of first wheels may be connected to the driving assembly such that the at least one of the pair of first wheels may be driven to rotate.

In one embodiment, the electronic apparatus may further include a main board and a flexible printed circuit received in the enclosure; wherein the flexible printed circuit may be electrically connected to the slidable device and the main board. The side plate may include a first housing wall defining the first through hole and a second housing wall opposite to the first housing wall.

In this embodiment, the enclosure may further include: a partition wall and a cover. The partition wall may be connected to the bottom plate and located between the first housing wall and the second housing wall. The driving mechanism and the slidable device may be located between the partition wall and the first housing wall, while the main board may be located between the partition wall and the second housing wall. A first gap may be defined between the top plate and the partition wall.

The cover may be located at one side of the top plate that is opposite to the bottom plate; wherein a receiving space may be defined between the cover and the top plate, and a second gap may be defined between the cover and the partition wall.

The flexible printed circuit may successively pass through the first gap, the receiving space and the second gap, and be further connected to the main board.

A mobile terminal is further provided in the present disclosure. The mobile terminal may include a front shell, a back shell connected to the front shell, a screen embedded in the front shell and covering the back shell, a slidable device movable between a first position at which the slidable device extends out of the back shell and a second position at which the slidable device retracts into the back shell and covered by the display area of the screen, and a driving mechanism, received in the back shell. The screen may have a display area configured to display images and information.

The driving mechanism may include: a first wheel and a driving assembly. The first wheel may be connected to the slidable device, abutting against an inner wall of the back shell and rotatable relative to the back shell to drive the slidable device to move between the first position and the second position. The driving assembly may be connected to the first wheel and configured to drive the first wheel to rotate.

In one embodiment, the mobile terminal may include a holder movable relative to the back shell; wherein the slidable device may be received in the holder and moves with the holder, and the driving assembly may be fixed to the holder. The back shell may include a top plate and a bottom plate which are spaced from and opposite to each other, and a side plate respectively connected to the top plate and the bottom plate. The driving mechanism may include a pair of first wheels, a pair of second wheels contacting with the pair of first wheels and rotatable with the pair of first wheels, a first shaft connected between the pair of first wheels, and a second shaft connected between the pair of second wheels.

In this embodiment, the pair of first wheels may abut against the top plate, while the pair of second wheels may abut against the bottom plate. The pair of first wheels may be located at two opposite sides of the holder, and the first shaft may pass through the two opposite sides of the holder. At least one of the pair of first wheels may be connected to the driving assembly such that the at least one of the pair of first wheels may be driven to rotate.

In one embodiment, the mobile terminal may further include a main board and a flexible printed circuit received in the back shell; wherein the flexible printed circuit may be electrically connected to the slidable device and the main board. The side plate may include a first housing wall defining the first through hole and a second housing wall opposite to the first housing wall.

In this embodiment, the back shell may further include: a partition wall and a cover. The partition wall may be connected to the bottom plate and located between the first housing wall and the second housing wall. The driving mechanism and the slidable device may be located between the partition wall and the first housing wall, while the main board may be located between the partition wall and the second housing wall. A first gap may be defined between the top plate and the partition wall.

The cover may be located at one side of the top plate that is opposite to the bottom plate; wherein a receiving space may be defined between the cover and the top plate, and a second gap may be defined between the cover and the partition wall.

The flexible printed circuit may successively pass through the first gap, the receiving space and the second gap, and be further connected to the main board.

For one skilled in the art, it is clear that the present application is not limited to the details of the above exemplary embodiments, and that the present application can be implemented in other specific forms without deviating from the spirit or basic characteristics of the application. Therefore, at any point, the embodiments should be regarded as exemplary and unrestrictive, and the scope of the present application is defined by the appended claims, rather than the above description. Therefore, all changes within the meaning and scope of the equivalent elements of the claim is intended to be included. Any appended label recited in the claims shall not be regarded as a limitation to the claims. In addition, apparently, the terms "include", "comprise" and the like do not exclude other units or steps, and the singular does not exclude plural.

It should be noted that, the foregoing disclosed is merely exemplary implementations and it is not intended to limit the scope of the present disclosure. Although the present disclosure is described in details with reference to the above embodiments, however, one skilled in the art may make any modification or equivalence based on the technical solution and the inventive concept of the present disclosure. All these modifications and equivalences shall all be covered within the protection claimed in the claims of the present disclosure.

What is claimed is:

1. A functional device for a mobile terminal, comprising:
   a housing, comprising a top plate and a bottom plate which are opposite to each other;
   a functional component, disposed in the housing and movable between a first position at which the functional component extends out of the housing and a second position at which the functional component retracts into the housing; and
   a driving mechanism, disposed in the housing and comprising:
      a first wheel, connected to the functional component, abutting against an inner wall of the housing and rotatable relative to the housing to drive the functional component to move between the first position and the second position; and
      a driving assembly, connected to the first wheel and configured to drive the first wheel to rotate;
      wherein at least one of the top plate and the bottom plate has a guiding rail arranged thereon; the guiding rail extends in a direction substantially parallel to a moving direction of the functional component, and the first wheel is rotatable along the guiding rail.

2. The functional device of claim 1, wherein the housing further comprises a side plate respectively connected to the top plate and the bottom plate; the first wheel is located between the top plate and the bottom plate, and contacts with at least one of the top plate and the bottom plate.

3. The functional device of claim 2, wherein;
   the functional device further comprises a damper arranged in the guiding rail.

4. The functional device of claim 2, wherein the first wheel comprises an inner ring and an outer ring sleeved on the inner ring; the inner ring is made of rigid material, while the outer ring is made of non-slip material.

5. The functional device of claim 2, wherein the driving mechanism comprises a pair of first wheels and a first shaft connected between the pair of first wheels; the pair of first wheels are located at two opposite sides of the functional component, and the first shaft is connected to the functional component, such that the functional component is driven to move;

at least one of the pair of first wheels is connected to the driving assembly such that the at least one of the pair of first wheels is driven to rotate.

6. The functional device of claim 5, wherein each of the pair of first wheels is arranged to contact with the housing by a surface contact and abuts against both the top plate and the bottom plate, and the functional component is located between the top plate and the bottom plate; or one end of the functional component is provided with the pair of first wheels, each of which abuts against one of the top plate and the bottom plate; the other end of the functional component is slidably connected to the other of the top plate and the bottom plate.

7. The functional device of claim 5, wherein the driving mechanism further comprises a pair of second wheels contacting with the pair of first wheels and rotatable with the pair of first wheels;

the pair of first wheels abut against the top plate, while the pair of second wheels abut against the bottom plate.

8. The functional device of claim 5, further comprising a holder movable relative to the housing; wherein the functional component is received in the holder and moves with the holder; the driving assembly is fixed to the holder, and the first wheel is located at an outside of the holder and rotatable relative to the holder.

9. The functional device of claim 8, wherein the driving assembly comprises:

a motor, received in the holder and having an output shaft;
a first gear, sleeved on the output shaft and rotatable with the output shaft; and
a second gear, sleeved on the first shaft and engaged with the first gear.

10. The functional device of claim 8, wherein the side plate defines a first through hole, and the functional component extends out of the housing or retracts into the housing via the first through hole;

the holder comprises a baffle located at the outside of the housing and configured to cover the first through hole when the functional component is in the second position.

11. The functional device of claim 10, further comprising a main board and a flexible printed circuit received in the housing; wherein the flexible printed circuit is electrically connected to the functional component and the main board.

12. The functional device of claim 11, wherein the holder further comprises a side wall located in the housing and opposite to the baffle, and a second through hole is defined in the side wall;

the main board is located outside the holder; one end of the flexible printed circuit is located in the holder and connected to the functional component, the other end of the flexible printed circuit extends out of the second through hole and is further connected to the main board.

13. The functional device of claim 11, wherein the side plate comprises a first housing wall defining the first through hole and a second housing wall opposite to the first housing wall;

the housing further comprises:

a partition wall, connected to the bottom plate and located between the first housing wall and the second housing wall; wherein the driving mechanism and the functional component is located between the partition wall and the first housing wall, while the main board is located between the partition wall and the second housing wall; a first gap is defined between the top plate and the partition wall; and a cover, located at one side of the top plate that is opposite to the bottom plate; wherein a receiving space is defined between the cover and the top plate, and a second gap is defined between the cover and the partition wall;

wherein the flexible printed circuit successively passes through the first gap, the receiving space and the second gap, and is further connected to the main board.

14. The functional device of claim 13, wherein the flexible printed circuit comprises a curved portion received in the receiving space; when the functional component is extending out of the housing, a length of the curved portion received in the receiving space is reduced; when the functional component is retracting into the housing, the length of the curved portion received in the receiving space is increased.

15. An electronic apparatus, comprising:

an enclosure, comprising a top plate and a bottom plate which are opposite to each other;
a screen engaged with the enclosure to define a chamber;
a slidable device movable between a first position at which the slidable device extends out of the chamber and a second position at which the slidable device retracts into the chamber and covered by the screen; and
a driving mechanism, received in the chamber and comprising:

a first wheel, connected to the slidable device, abutting against an inner wall of the enclosure that forms the chamber and rotatable relative to the enclosure to drive the slidable device to move between the first position and the second position; and
a driving assembly, connected to the first wheel and configured to drive the first wheel to rotate;
wherein the driving mechanism comprises a pair of first wheels and a first shaft connected between the pair of first wheels; the pair of first wheels are located at two opposite sides of the functional component, and the first shaft is connected to the functional component, such that the functional component is driven to move;
at least one of the pair of first wheels is connected to the driving assembly such that the at least one of the pair of first wheels is driven to rotate.

16. The electronic apparatus of claim 15, further comprising a holder movable relative to the enclosure; wherein the slidable device is received in the holder and moves with the holder, and the driving assembly is fixed to the holder;

the enclosure further comprises a side plate respectively connected to the top plate and the bottom plate;
the driving mechanism comprises a pair of second wheels contacting with the pair of first wheels and rotatable with the pair of first wheels and a second shaft connected between the pair of second wheels; the pair of first wheels abut against the top plate, while the pair of second wheels abut against the bottom plate;
the first shaft passes through the two opposite sides of the holder.

17. The electronic apparatus of claim 16, further comprising a main board and a flexible printed circuit received in the enclosure; wherein the flexible printed circuit is electrically connected to the slidable device and the main board;

the side plate comprises a first housing wall defining the first through hole and a second housing wall opposite to the first housing wall;

the enclosure further comprises:
- a partition wall, connected to the bottom plate and located between the first housing wall and the second housing wall; wherein the driving mechanism and the slidable device is located between the partition wall and the first housing wall, while the main board is located between the partition wall and the second housing wall; a first gap is defined between the top plate and the partition wall; and
- a cover, located at one side of the top plate that is opposite to the bottom plate;

wherein a receiving space is defined between the cover and the top plate, and a second gap is defined between the cover and the partition wall;

wherein the flexible printed circuit successively passes through the first gap, the receiving space and the second gap, and is further connected to the main board.

18. A mobile terminal, comprising:

a front shell;

a back shell connected to the front shell and comprising a top plate and a bottom plate which are spaced from and opposite to each other;

a screen embedded in the front shell and covering the back shell, the screen having a display area;

a slidable device, movable between a first position at which the slidable device extends out of the back shell and a second position at which the slidable device retracts into the back shell and covered by the display area of the screen; and a driving mechanism, received in the back shell and comprising:
- a first wheel, connected to the slidable device, abutting against an inner wall of the back shell and rotatable relative to the back shell to drive the slidable device to move between the first position and the second position; and
- a driving assembly, connected to the first wheel and configured to drive the first wheel to rotate;

wherein at least one of the top plate and the bottom plate has a guiding rail arranged thereon; the guiding rail extends in a direction substantially parallel to a moving direction of the functional component, and the first wheel is rotatable along the guiding rail.

19. The mobile terminal of claim 18, further comprising a holder movable relative to the back shell; wherein the slidable device is received in the holder and moves with the holder, and the driving assembly is fixed to the holder;

the back shell comprises a side plate respectively connected to the top plate and the bottom plate;

the driving mechanism comprises a pair of first wheels, a pair of second wheels contacting with the pair of first wheels and rotatable with the pair of first wheels, a first shaft connected between the pair of first wheels, and a second shaft connected between the pair of second wheels; the pair of first wheels abut against the top plate, while the pair of second wheels abut against the bottom plate;

the pair of first wheels are located at two opposite sides of the holder, and the first shaft passes through the two opposite sides of the holder; at least one of the pair of first wheels is connected to the driving assembly such that the at least one of the pair of first wheels is driven to rotate.

20. The mobile terminal of claim 19, further comprising a main board and a flexible printed circuit received in the back shell; wherein the flexible printed circuit is electrically connected to the slidable device and the main board;

the side plate comprises a first housing wall defining the first through hole and a second housing wall opposite to the first housing wall;

the back shell further comprises:
- a partition wall, connected to the bottom plate and located between the first housing wall and the second housing wall; wherein the driving mechanism and the slidable device is located between the partition wall and the first housing wall, while the main board is located between the partition wall and the second housing wall; a first gap is defined between the top plate and the partition wall; and
- a cover, located at one side of the top plate that is opposite to the bottom plate;

wherein a receiving space is defined between the cover and the top plate, and a second gap is defined between the cover and the partition wall;

wherein the flexible printed circuit successively passes through the first gap, the receiving space and the second gap, and is further connected to the main board.

* * * * *